United States Patent
Kersten et al.

[11] 3,970,360
[45] July 20, 1976

[54] WAVE-GUIDE STRUCTURE WITH A MULTI-LAYER SYSTEM AND METHODS FOR PRODUCING SAME

[75] Inventors: Ralf Kersten; Hans Mahlein; Rudolf Oberbacher, all of Munich, Germany

[73] Assignee: Siemens Aktiengesellschaft, Berlin & Munich, Germany

[22] Filed: Apr. 17, 1975

[21] Appl. No.: 569,305

[30] Foreign Application Priority Data
Apr. 19, 1974 Germany.............................. 2418994

[52] U.S. Cl. .......................... 350/96 WG; 350/96 C
[51] Int. Cl.² ...................... G02B 5/14; G02B 5/20; G02B 5/30
[58] Field of Search ..................... 350/96 WG, 96 C

[56] References Cited
UNITED STATES PATENTS

| | | | |
|---|---|---|---|
| 3,760,292 | 9/1973 | Kogelnik et al. .............. | 350/96 WG |
| 3,826,992 | 7/1974 | Friedl............................... | 350/96 C |
| 3,868,589 | 2/1975 | Wang .............................. | 350/96 WG |
| 3,884,549 | 5/1975 | Wang et al. ..................... | 350/96 WG |

*Primary Examiner*—John K. Corbin
*Assistant Examiner*—Wm. H. Punter
*Attorney, Agent, or Firm*—Hill, Gross, Simpson, Van Santen, Steadman, Chiara & Simpson

[57] ABSTRACT

A wave-guide structure for use in optical communications and a method of producing the wave-guide structure characterized by a substrate of a given index of refraction, a wave-guide layer having lateral edges and a different index of refraction disposed on a surface of the substrate and a multi-layer system extending through the wave-guide layer between the lateral edges to separate the wave-guide layer into two wave-guide portions which are integral with the multi-layer system and in planar alignment with each other, the multi-layer system comprises a plurality of layers with different indexes of refraction which layers extend at either a right angle or oblique angle to the surface of the wave-guide layer and at either a right angle or an oblique angle to the lateral edges so that radiation transmitted in one of the wave-guide portions has an angle of incident with the multi-layer system. The multi-layer system may extend partially ito the substrate or completely therethrough. The method of producing the various wave-guide structures includes providing a substrate having at least one flat surface, either cutting a groove in the substrate to subdivide the flat surface or cutting the substrate into a pair of substrate portions, applying the multi-layer system either to a side wall of the groove or one of the cut surfaces, and providing the formation of wave-guide layers on the flat surface.

9 Claims, 10 Drawing Figures

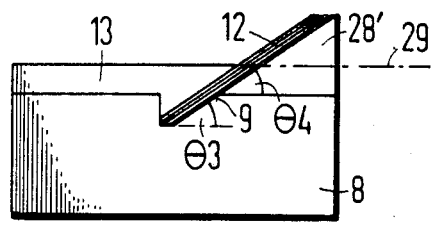
Fig. 6
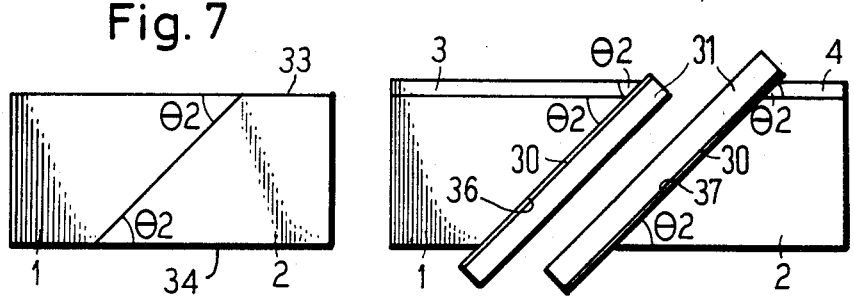
Fig. 7
Fig. 8
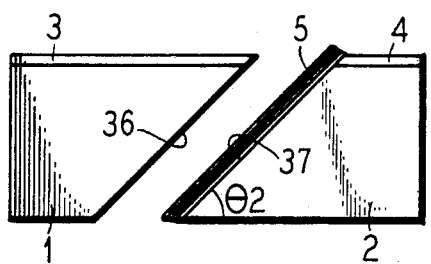
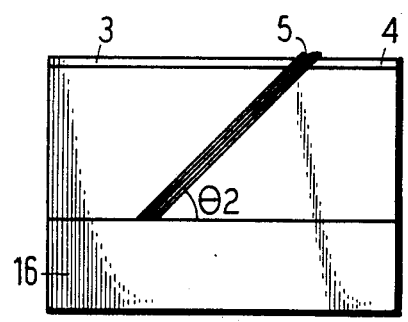
Fig. 9
Fig. 10

WAVE-GUIDE STRUCTURE WITH A MULTI-LAYER SYSTEM AND METHODS FOR PRODUCING SAME

BACKGROUND OF THE INVENTION

The present invention is directed to a wave-guide structure comprising a wave-guide layer applied to a substrate, which wave-guide layer has incorporated therein a thin multi-layer system, for use in optical communication techniques and method for producing the wave-guide structure.

Wave-guide structures which include modulators of an integrated construction, laser amplifiers and coupling devices have been disclosed in an article by Miller, *The Bell System Technical Journal*, Volume 48, 1969, pp. 2059–2969 and in an article by E. A. Aschmoneit, *Elektrotechnische Zietschrift*, Volume 22, 1970, pp. 499–501. These references also disclose various processes for producing the above-mentioned wave-guide structures.

The construction and properties of multi-layers were described in a book, H. A. Macleod, *Thin Film Optical Filters*, Adam Higler, Ltd., London, 1969, pp. 37–87, 154–199, and 301–304. Utilizing the theory described in this book, it is possible to construct multi-layer systems from dielectric thin layers which change the spectral or polarization properties of the optical radiation in a purposeful fashion or serve as reflectors. For example, the properties of the optical radiation can be changed by constructing a multi-layer system as either a narrow-band interference filter, a beam divider, or a system for improving the optical properties.

When constructing a polarizer for light waves directed onto a multi-layer system and likewise when constructing a spectral-selective filter, the number of layers having high and low indexes of refraction, the relationship of the indexes of refraction, and the inclination of the layers to the direction of propagation of the light waves are important. The particular relationship of the number of layers, their index of refraction and their inclination are discussed in the German Printed Application P 22 52 826.3.

To provide a non-polarizing beam splitter for light waves which have a wave length $\lambda 0$, all the layers of the multi-layer system require an effective optical thickness which is equal to an odd number multiple of $\lambda 0/4$. In addition, the inclination of the surface of the multi-layer system is selected so that the reflectance is the same for the components of the radiation which falls on this system, which components oscillate at right angles and parallel to the incidence plane. A detailed discussion of these requirements is contained in the German Printed Application P 23 32 254.5.

SUMMARY OF THE INVENTION

The present invention is directed to providing a wave-guide structure for use in optical communication technique, which wave-guide structure contains an integral multi-layer system which consists of a plurality of layers having different indexes of refraction and which extend at a right angle or obliquely to the surface of the wave-guide layer, and to provide a method for easily constructing the wave-guide structure. The multi-layer system can be constructed to act as either a polarizer, a spectral-selective filter, a polarizing or polarizing beam splitter or a reflector. An advantage of the integral construction of the multi-layer system consists in that for any special function such as either the angle of the change of the direction of the guided waves in the beam splitter, the frequency selection in the spectral-selective filter or the degree of polarization in the polarizer can be accurately determined in a wave-guide layer having a thickness of a few wave lengths.

To accomplish these tasks, wave-guide structure comprises a substrate of a given index of refraction, a wave-guide layer having lateral edges and a different index of refraction disposed on a surface of the substrate, and the multi-layer system extending through the wave-guide layer between the lateral edges to separate the wave-guide layer into two wave-guide portions which are integral with the multi-layer system and in planar alignment with each other, said multi-layer system comprises a plurality of layers with different indexes of refraction, said layer extending at an angle to the surface of the wave-guide layer which angle may be an oblique angle or a right angle and extends at an angle to the lateral edges which angle may be either an oblique or right angle. The multi-layer system may extend partially into the substrate or completely through the substrate in which case a pair of substrate portions are joined to the multi-layer system. If desired, a base member may be included to facilitate maintaining the planar alignment of the wave-guide portions.

To produce a wave-guide structure in which the multi-layer system extends partially into the substrate, the method comprises providing a substrate having a flat surface and at least one side surface forming a right angle therewith, forming a groove extending across the flat surface with an angle to the side surface to separate the flat surface into first and second portions, said groove having a side wall terminating at the first portion of the flat surface and extending at an angle to the flat surface, one of said angles being an oblique angle, applying a thick layer of material of the wave-guide layer on the first portion with an edge surface of the thick layer coplanar with the side wall, applying a multi-layer system to the coplanar sides of the groove and the edge surface of the thick layer, applying a wave-guide layer to the second portion of the flat surface and adjacent to the exposed surface of the multi-layer system and polishing the thick layer and exposed portion of the multi-layer system to a smooth surface parallel to the flat surface of the substrate. Preferably, the angle of the side wall of the groove to the flat surface of the substrate is an oblique angle and the thick layer may be a wedge member or a layer having a wedge configuration which is either deposited or joined to the first portion, and the application of the layer to the second portion of the substrate includes filling a wedge-shaped portion of the groove which did not contain the multi-layer system.

To produce a wave-guide structure in which a multi-layer system extends through both the wave-guide layer and the substrate to form two substrate portions, two embodiments of the method can be utilized. The first embodiment includes the steps of providing a parallelepiped-shaped substrate having a plurality of side surfaces, cutting the substrate into a pair of substrate portions with each portion having a cut planar surface extending in an oblique angle to one of the side surfaces of the substrate portions, applying a multi-layer system to the planar cut surface of one of said pair of substrate portions, joining the planar cut surface of the other of said pair of substrate portions on an exposed surface of the multi-layer system with the side surfaces of the joined portions being in parallel alignment to form a block, cutting the block parallel to one of said parallel aligned side surfaces to form a pair of block members, polishing the cut surface of the block member, treating the polished cut surface to increase the index of refraction of a thin surface layer to form the wave-guide layer. The step of treating can be either by ion implantation or diffusion of material into or out of the polished cut surface. If desired, a base member can be applied or attached onto the block member opposite the wave-guide layer.

The second embodiment of the method includes providing a parallelepiped-shaped substrate with first and second polished surfaces arranged opposite to one another, cutting the substrate into a pair of substrate portions having cut planar surfaces extending at an angle to the first polished surface and at an angle to an adjacent side surface, one of said angles being an oblique angle, providing a pair of polished glass plates each having a slightly soluable thin layer on a surface thereof, applying the polished glass plates to the cut planar surfaces with the thin layer engaging the planar cut surfaces, applying a wave-guide layer to the first polished surface of each of the substrate portions, removing the polished glass plates from the two substrate portions, applying a multi-layer system to the cut planar surfaces of one of the pair of substrate portions and to the adjoining wave-guide layer, providing a base plate, positioning the second polished surfaces of the pair of substrate portions on the base plate and joining the cut surfaces of the other of the pair of substrate portions to the multi-layer system with the second polished surfaces of the pair of substrate portions being joined to the plate member.

BRIEF DESCRIPTION OF THE DRAWINGS

FIG. 6 illustrates a method of providing the wave-guide system illustrated in FIG. 2; and FIGS. 7–10 illustrate a second embodiment of the method for forming wave-guide structures of the present invention substantially similar to the embodiment illustrated in FIG. 1.

DESCRIPTION OF THE PREFERRED EMBODIMENTS

Figure 1:
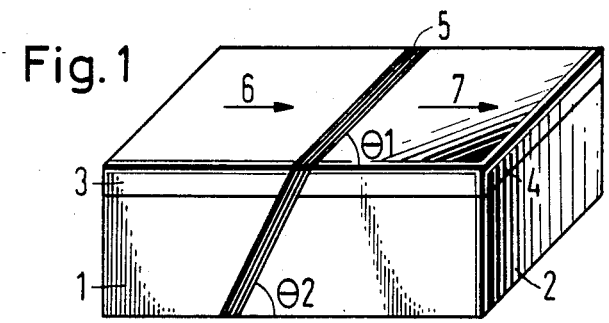
FIG. 1 is an isometric view of one embodiment of the present invention.

The principles of the present invention are particularly useful in a wave-guide structure illustrated in FIG. 1. The wave-guide structure of FIG. 1 has a multi-layer system 5, which subdivides a parallelepiped-shaped substrate into a pair of substrate components or portions 1 and 2 and subdivides a wave-guide layer on a surface of the substrate into wave-guide portions 3 and 4. The multi-layer system 5 consists of a plurality of thin dielectric layers having alternately high and low indexes of refraction with the effective optical layer thickness of each individual layer being an odd number multiple of $\lambda 0/4$ where $\lambda 0$ is the vacuum wave length of the incoming light being transported in the wave-guide layer portion 3. The wave-guide portions 3 and 4 have an index of refraction which is higher than the index of refraction of the substrate formed by the substrate portions 1 and 2. The multi-layer system 5 forms an oblique angle $\theta 2$ with the flat surface of the substrates formed by the portions 1 and 2 such as the base surface. The multi-layer system 5 also forms an angle $\theta 1$ which is at right angles or 90° angle with a lateral edge or boundary edge of the wave-guide layer formed by the wave-guide portions 3 and 4.

If the multi-layer system 5 is to act as a frequency-selective filter, a white light incoming at a propagation direction indicated by the arrow 6 in the wave-guide portion 3 has an angle of incidence on the multi-layer system 5 of 90° - $\theta 2$. Thus, the light, which passes through the multi-layer system 5 into the wave-guide portion 4 as indicated by the arrow 7, will have a narrow frequency band. In selecting the indexes of refraction, the layer thickness of the layers of the multi-layer system 5, and the angle of incidence 90° - $\theta 2$ of the light on the multi-layer system 5, the theories of the above-mentioned book by Macleod are utilized.

Figure 2:
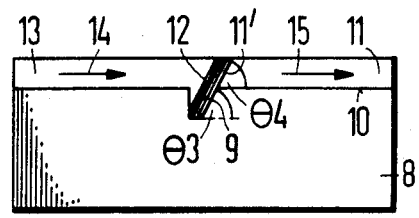
FIG. 2 is a side view of a second embodiment of the present invention.

In FIG. 2, a second embodiment of the present invention is illustrated. The embodiment of FIG. 2 utilizes a substrate 8 having a flat surface 10 with at least one side surface extending perpendicular thereto. A groove having a side wall 9 is formed in the substrate to subdivide the flat surface 10 into two portions. As illustrated, the groove extends perpendicular or at right angles to the side surface of the substrate 8 and the side wall 9 has an oblique angle $\theta 3$ to the right-hand portion of the flat surface 10 which is provided with a wave-guide portion 11 coacting with a wave-guide portion 13 on the opposite side of the groove to form the wave-guide layer. The wave-guide portion 11 has an edge or end surface 11' which is coplanar with the side wall 9 and thus extends at oblique angles $\theta 4$ to the surface 10. A multi-layer system 12 engages the side wall 9 and the edge surface 11' so that each of the layers of the system 12 extend at the angle $\theta 3$ to the flat surface 10.

The layers 11 and 13 have the same index of refraction which is higher than the index of refraction of the substrate 8 so that light guided into the wave-guide layer portion 13 in the direction of arrow 14 moves in the same direction 15 in the portion 11 after passing through the multi-layer system 12.

In utilizing either the embodiment of FIG. 1 or FIG. 2, the particular requirements for the angle of incidence of the light such as 90° - $\theta 2$ or 90° - $\theta 3$ requires small angles so that the multi-layer system 5 or 12 will extend at an oblique angle to the interface between the flat surface of the substrate and the wave-guide portions and extends at right angles to the edges of the wave-guide portions and the side surfaces of the substrate. However, when the optical requirements require a large angle of incidence, the multi-layer system is advantageously arranged to have an oblique angle with the lateral limits of the wave-guide layer and to be at right angles to the flat surface forming the interface with the wave-guide portions.

Figure 3:
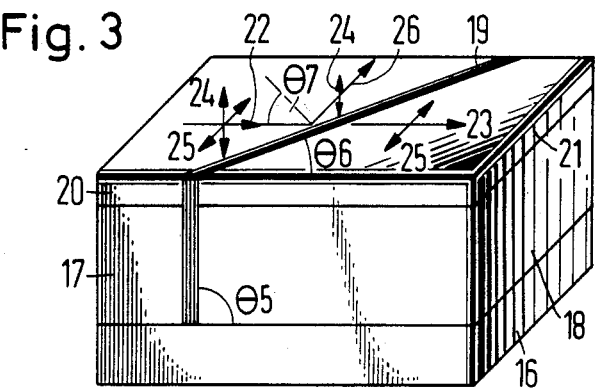
FIG. 3 is an isometric view of a third embodiment of the present invention.

FIG. 3 illustrates an embodiment in which a multi-layer system 19 extends at a right angle to the interface or flat surface of the substrate receiving the wave-guide portions 20 and 21 and at an oblique angle to the lateral edges of the wave-guide portions 20 and 21. In the embodiment of FIG. 3, a substrate is formed by substrate portions 17 and 18 which form a parallelepiped substrate which is joined on a base plate or member 16. An upper flat surface of the substrate portion 17 is provided with the wave-guide portion 20 and the upper flat surface of the substrate portion 18 is provided with the wave-guide portion 21 which wave-guide portions coact to form the wave-guide layer which is divided by the multi-layer system 19. As illustrated, the multi-layer system 19 forms a right angle $\theta5$ to a base surface and to the flat surface forming the interface with the wave-guide layer and forms an oblique angle $\theta6$ with the lateral edges or boundary edges of the two wave-guide layers 20 and 21.

If the multi-layer system 19 is to be utilized as a polarizer, a non-polarized, monochromatic light moving in a direction 22 in the layer 20 strikes the interface layer system 19 which passes a linearly polarized light 23 into the layer portion 21 and reflects a light beam 26 out of the layer portion 20.

To accomplish this, the base member 16 and the substrate portions 17 and 18 are glass components having an index of refraction of $N_1 = 1.44$, the wave-guide layers 20 and 21 are selected of a material having an index of refraction $N_2 = 1.47$ and the oblique angle $\theta6$ must equal 36° to enable the fulfillment of the Brewster condition at the boundaries of the sub-layers forming the multi-layer system 19. The sub-layers of the multi-layer system 19 have both alternately high and low indexes of refraction with the indexes of refraction $N_{high} = 2.35$ and $N_{low} = 1.38$. The angle $\theta6 = 36°$ will correspond to an angle of incidence $\theta7 = 54°$. The non-polarized monochromatic light beam 22 will possess oscillation directions 24 and 25 which are at right angles to each other. After penetration of the multi-layer system 19, the beam 23 will have the oscillation direction 25 whereas the reflected beam 26 will have the oscillation direction 24. The direction of movement of the beam 26 in the wave-guide layer 20 is such that this arrangement can also be used as a polarizing beam splitter. The particular relationships of the various layer thicknesses of the system 19 are selected in accordance with the teaching of the above-mentioned references.

Figure 4:
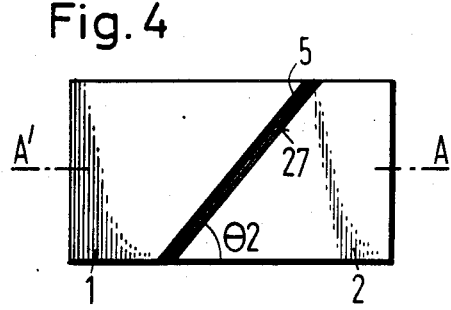
FIGS. 4 and 5 illustrate one embodiment of the method of providing the wave-guide system of the present invention such as illustrated in FIG. 1.
Figure 5:
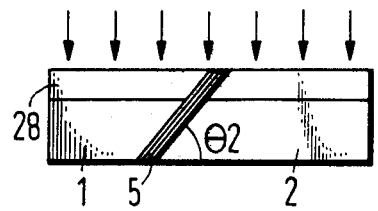

One method of producing the wave-guide structure such as the embodiment illustrated in FIG. 1 is schematically illustrated in FIGS. 4 and 5. The method comprises providing a parallepiped glass component of a large cross-sectional dimension, cutting the substrate along a plane having an oblique angle $\theta2$ with one side of the substrate to form substrate portions 1 and 2 with the portions having an oblique surface such as 27 of the portion 2. Following the formation of the two substrate portions 1 and 2, the multi-layer system 5 is applied to one of the oblique surfaces such as 27 of the portion 2 by an appropriate vapor deposition process of sequentially applying alternate layers of different refractive indexes. Subsequent to the applying of the system 5, the component of substrate portion 1 is joined to the system 5 such as by cementing or by applying force or pressure to cause molecular adhesion or bonding with its side edges in coplanar arrangement with the side edges of the portion 2 to form a block such as illustrated in FIG. 4. Subsequent to forming the block, the block is cut on a line A,A' which is parallel to one of the side surfaces to form a pair of block members such as illustrated in FIG. 5.

Subsequent to forming the pair of block members, the cut surface of the block member is polished to form a continuously smooth plane and subsequently treated by either ion implantation or diffusion of a material into the polished surface as indicated by the arrows in FIG. 5. This treating step will increase the index of refraction in a thin surface zone or layer 28 on the cut surface. The layer or zone 28 provides the wave-guide portions 3 and 4 of FIG. 1 and a cohesive wave-guide structure.

To form the embodiment of FIG. 2, a substrate 8 which is a parallelepiped glass member having a smooth surface 10 is provided. A groove having the side wall 9 is cut in the surface 10 to subdivide the surface into two portions. The groove can be formed such as by milling with a single milling machine having a single cutting or milling device and, as illustrated, the side wall 9 forms an oblique angle $\theta3$ with a flat surface 10. A thick layer of material forming the wave-guide portion 11 is applied on the right-hand side of the groove either by vapor deposition or by applying a wedge member 28' which may be applied by force or pressure to cause molecular adhesion of the member to the substrate 8. In applying the wedge-shaped member 28', a surface having the oblique angle $\theta4$ is aligned to be coplanar with the side wall 9. After applying the wedge member, the remaining flat surface 10 is provided with a covering and the multi-layer system 12 is applied to the side wall 9 and the coplanar surface of the wedge 28'. This application is preferably done by a vapor depositing of the thin layers of the system 12 and as illustrated the entire groove is not filled with the multi-layer system. Subsequent to applying the multi-layer system 12, the covering is removed and a material of a wave-guide 13, which material is of the same index of refraction as the wedge 28', is applied and as illustrated fills up the wedge-shaped portion of the groove which did not contain any of the multi-layer system 12. Subsequent to the application of the wave-guide portion 13, part of the wedge member 28' and the multi-layer system 12 are removed by polishing to a plane 29 which is coplanar with the upper surface of the wave-guide portion 13.

A second method for forming the embodiment of the wave-guide structure such as illustrated in FIG. 1 is illustrated in FIGS. 7-10. In this embodiment, a glass parallelepiped serving as a substrate is provided with polished surfaces 33 and 34 which, as illustrated in FIG. 7, are the upper and lower surfaces. The substrate is cut into two substrate portions 1 and 2 with the cutting forming cut surfaces 36 and 37 (FIG. 8) with surface 36 extending at oblique angle $\theta2$ from polished surface 33 of portion 1 and cut surface 37 extending at oblique angle $\theta2$ from polished surface 34 of portion 2. After cutting the substrate to form the planar cut surfaces 36 and 37, they are polished. A pair of polished glass plates 31, which are each provided with a thin layer 30 of a slightly soluable material on one surface, are applied to the polished cut surfaces 36 and 37 (FIG. 8) with the layer 30 engaging the surfaces. With the plates 31 applied on the portions 1 and 2, wave-guide layers 3 and 4 are applied such as by vapor deposition with the plates 31 acting as molding surfaces so that the edges of the wave-guide portion 3 adjacent the cut surface 36 is coplanar therewith and has an angle $\theta2$ and so that the edge portion or surface of the layer 4 which is adjacent the surface 36 is coplanar therewith and has an angle $\theta2$. After applying the wave-guide layers 3 and 4, the glass plates 31 are removed and the multi-layer system 5 is applied to one of the polished surfaces such as the surface 37 and the coplanar portion of the wave-guide portion 4 (FIG. 9). The application of the system 5 can be by vapor depositing of the various layers of the multi-layer system 5 utilizing a high vacuum.

With the multi-layer system 5 applied to the surface 37, the member or portion 1 is joined onto the system 5 either by cement or by molecular bonding with the polished surfaces 33 and 34 in coplanar alignment. It has been found advisable to utilize a base member 16 having a polished surface on which the two members 1 and 2 are positioned and which are attached to the base member as the member 1 is attached the multi-layer system 5. It should be noted that prior to joining the base member 16, the lower polished surface 34 will require polishing so that the system 5 is coplanar therewith.

While the method illustrated in FIGS. 7–10 and the method illustrated in FIGS. 4–5 were described for forming an embodiment such as that illustrated in FIG. 1, these methods can be modified to produce the embodiment of FIG. 3 with the only distinction being the particular surface of the substrate which receives the base member 16 and receives the wave-guide layer.

As mentioned above, using the methods of FIGS. 4 and 5 or FIG. 6, it is necessary that the multi-layer system be polished to have a flat surface which is coplanar with the surfaces of the wave-guide layer. The step of applying each of the multi-layer systems preferably uses a vapor depositing technique which uses a high vacuum technique. While each of the above sample embodiments has a wave-guide layer that extends to the edge of the substrate, the lateral edges of the waveguide layers may terminate inward of the sides of the substrate. This may be accomplished by appropriate masking during the step of applying the wave-guide material and enables the wave-guide layer to assume any desired shape.

Although various minor modifications may be suggested by those versed in the art, it should be understood that we wish to employ within the scope of the patent granted hereon, all such modifications as reasonably and properly come within the scope of our contribution to the art.

We claim:

1. A wave-guide structure for use in optical communications comprising a substrate of a given index of refraction, a wave-guide layer having lateral edges and a different index of refraction disposed on a surface of the substrate, and a multi-layer system extending through the wave-guide layer between the lateral edges to separate the wave-guide layer into two wave-guide portions which are integral with the multi-layer system and in planar alignment with each other, said multi-layer system comprising a plurality of layers with different indexes of refraction, said multi-layer system extending at an angle to a surface of the wave-guide layer and at an angle to the lateral edges with at least one of the angles being an oblique angle so that radiation transported in one of the wave-guide portions has an angle of incidence with the multi-layer system.

2. A wave-guide structure according to claim 1, wherein the angle of the multi-layer system to the lateral edges is an oblique angle and wherein the angle of the multi-layer system to the surface of the wave-guide layer is a right angle.

3. A wave-guide structure according to claim 1, wherein the angle of the multi-layer system to the lateral edges is a right angle and the angle of the multi-layer system to the surface of the wave-guide layer is an oblique angle.

4. A wave-guide structure according to claim 1, wherein the multi-layer system extends partially into the substrate.

5. A wave-guide structure according to claim 4, wherein the angle of the multi-layer system to the lateral edges is a right angle and the angle of the multi-layer system to the surface of the wave-guide layer is an oblique angle.

6. A wave-guide structure according to claim 1, wherein the multi-layer system extends through the substrate to form a pair of substrate portions joined to the multi-layer system.

7. A wave-guide structure according to claim 6, wherein the angle of the multi-layer system to the lateral edges is an oblique angle and wherein the angle of the multi-layer system to the surface of the wave-guide layer is a right angle.

8. A wave-guide structure according to claim 6, wherein the angle of the multi-layer system to the lateral edges is a right angle and the angle of the multi-layer system to the surface of the wave-guide layer is an oblique angle.

9. A wave-guide structure according to claim 6, which further includes a base plate, and wherein the substrate portions are disposed on the base plate to maintain the planar alignment of the wave-guide portions.

* * * * *